US012113766B2

(12) United States Patent
Hensler

(10) Patent No.: US 12,113,766 B2
(45) Date of Patent: Oct. 8, 2024

(54) ADDRESS RESOLUTION PROTOCOL REQUEST RESOLUTION

(71) Applicant: Microsoft Technology Licensing, LLC, Redmond, WA (US)

(72) Inventor: Kenyon James Hensler, Acworth, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/065,575

(22) Filed: Dec. 13, 2022

(65) Prior Publication Data

US 2024/0195777 A1    Jun. 13, 2024

(51) Int. Cl.
*H04L 61/103* (2022.01)
*H04L 101/622* (2022.01)

(52) U.S. Cl.
CPC ...... *H04L 61/103* (2013.01); *H04L 2101/622* (2022.05)

(58) Field of Classification Search
CPC .................................................. H04L 61/103
USPC ........................................................ 709/328
See application file for complete search history.

(56) References Cited

U.S. PATENT DOCUMENTS

| | | | |
|---|---|---|---|
| 2016/0065676 A1* | 3/2016 | Mergen ................. | H04L 67/303 709/220 |
| 2018/0262458 A1* | 9/2018 | Mathew .............. | H04L 12/4633 |
| 2019/0213349 A1* | 7/2019 | Luo ..................... | H04L 63/0227 |

FOREIGN PATENT DOCUMENTS

EP    3975508 A1    3/2022

OTHER PUBLICATIONS

Anonymous, "Proxy ARP—Wikipedia, the free encyclopedia," Oct. 14, 2014, 3 Pages.
Carl-Mitchell, et al., "Using ARP to Implement Transparent Subnet Gateways," Oct. 1, 1987, 9 Pages.
International Search Report and Written Opinion received for PCT Application No. PCT/US23/036830, Feb. 27, 2024, 15 pages.
Shah, et al., "ARP Broadcast Reduction for Large Data Centers," Oct. 28, 2011, 11 Pages.

\* cited by examiner

*Primary Examiner* — Sibte H Bukhari
(74) *Attorney, Agent, or Firm* — Alleman Hall & Tuttle LLP

(57) ABSTRACT

A method for resolving address resolution protocol (ARP) requests includes, at an ARP listening entity of a computer network, receiving an ARP request for a MAC (media access control) address of a destination entity having a specified IP (internet protocol) address, the ARP request received from a requesting entity, wherein a design of the computer network prevents broadcast of the ARP request to the destination entity. An ARP response is transmitted to the requesting entity, the ARP response specifying a response MAC address to facilitate transmission, by the requesting entity, of a data packet targeting the response MAC address, and wherein prior to receipt of the data packet at the destination entity, the specified IP address is associated with an actual MAC address of the destination entity according to an IP-to-MAC mapping.

10 Claims, 6 Drawing Sheets

ADDRESS RESOLUTION PROTOCOL REQUEST RESOLUTION

BACKGROUND

Address resolution protocol (ARP) is used by a computer network entity, such as a physical computing device or virtual entity (e.g., virtual machine, management service), to discover the media access control (MAC) address of another entity in the same network having a specified internet protocol (IP) address. Typically, a requesting entity broadcasts an ARP request to each other entity in the network. Any entity having an IP address that matches the IP address specified in the ARP request provides an ARP response to the requesting entity, the ARP response specifying the responding entity's MAC address.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure is generally directed to techniques for responding to an address resolution protocol (ARP) request transmitted by a requesting entity in a computer network, the ARP request specifying an IP address of a destination entity. This can, in some examples, enable resolution of the ARP request when a design of the computer network prevents broadcast of the ARP request to the destination entity. The ARP request is received at an ARP listening entity, different from the destination entity, which provides an ARP response that specifies a response media access control (MAC) address. The ARP response facilitates transmission, by the requesting entity, of a data packet targeting the response MAC address. Prior to receipt of the data packet at the destination entity, the specified IP address is associated with an actual MAC address of the destination entity according to an IP-to-MAC mapping.

DETAILED DESCRIPTION

Figure 1A:
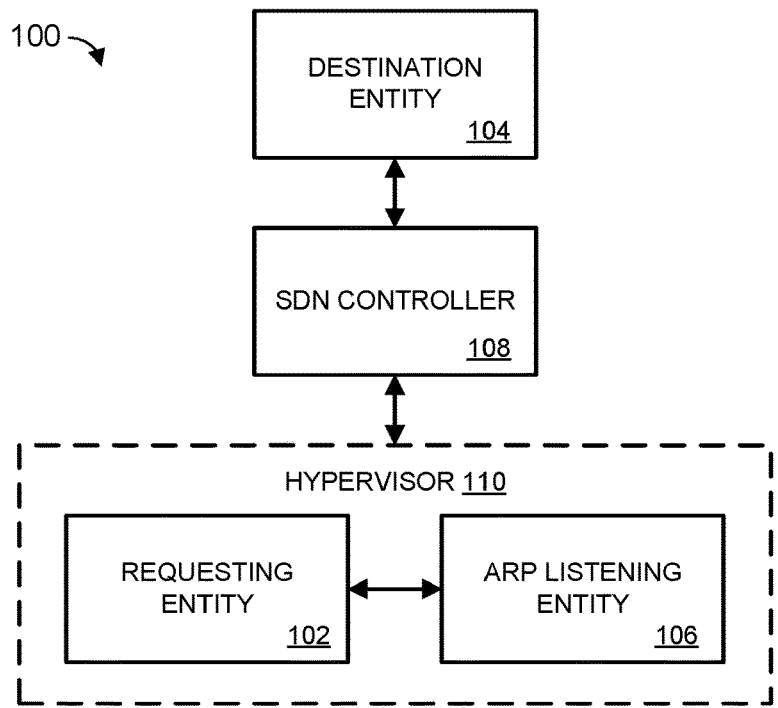
FIGS. 1A-1D schematically show aspects of an example computer network.

Network conditions sometimes arise in which it is not possible for a destination network entity to appropriately respond to an address resolution protocol (ARP) request transmitted by a requesting network entity—e.g., on the same broadcast domain, or beyond a network gateway. In some examples, the computer network in which the requesting and destination entities operate does not support broadcast—e.g., the network is a software-defined network that does not respond appropriately to ARP requests on virtual local access network (VLAN) tagged interfaces. This can be the case when, for example, broadcast is disabled due to intentional security policies, due to hardware/software bugs, or for any other suitable reason that interferes with or prevents typical ARP broadcasting. In other words, in some cases, a design of the computer network prevents broadcast of the ARP request to the destination entity, and/or receipt of an ARP response transmitted by the destination entity back to the requesting entity.

Accordingly, the present disclosure is directed to techniques for resolving ARP requests, which can beneficially enable a requesting network entity to communicate with a destination entity even in cases where broadcasting the ARP request is not possible—e.g., due to a design of the computer network preventing such broadcast. Specifically, the requesting entity transmits an ARP request, specifying an internet protocol (IP) address of a destination entity on the computer network. The ARP request is received by an ARP listening entity, different from the destination entity, which provides an ARP response specifying a response media access control (MAC) address. The requesting entity then transmits a data packet intended for delivery to the destination entity that targets the response MAC address. Prior to receipt of the data packet at the destination entity, the specified IP of the destination entity is associated with an actual MAC address of the destination entity—e.g., by a software-defined networking (SDN) controller.

In some examples, the response MAC address is a predefined placeholder MAC address that can be used to refer to any destination entity outside the local network node (e.g., hypervisor). After the requesting entity transmits a data packet targeting the placeholder MAC address, the SDN controller replaces the placeholder MAC address with the actual MAC address of the destination entity according to an IP-to-MAC mapping. In other examples, the response address provided by the ARP listening entity is the actual MAC address of the destination entity. In other words, prior to transmitting the ARP response to the requesting entity, the ARP listening entity determines the actual MAC address of the destination entity (e.g., by consulting an SDN controller) according to the IP-to-MAC mapping. Regardless, in either case, the data packet is delivered to the destination entity with the actual MAC address, even if a placeholder MAC address was previously provided in the ARP response.

FIGS. 1A-1D schematically illustrate aspects of a computer network useable to implement the approach outlined above. Specifically, FIG. 1A schematically shows simplified components of an example computer network 100, including a requesting entity 102 and destination entity 104. Computer network 100 additionally includes an ARP listening entity 106 and SDN controller 108. As used herein, a network "entity" refers to any suitable physical device or virtual entity. In the example of FIG. 1A, the requesting entity and ARP listening entity are each virtual machines (VMs) hosted by a same hypervisor 110. In some cases, a network entity refers to a virtual interface or service running on a hypervisor—e.g., as part of a management interface. In some cases, an "entity" refers to a distinct physical device, such as a compute node. An "entity" as described herein is in some cases implemented as or by computing system 500 described below with respect to FIG. 5.

Although only one requesting entity is shown in FIG. 1A, it will be understood that this is non-limiting. In other examples, a hypervisor is used to host any suitable number of different virtual machines, any or all of which are configured to transmit ARP requests to other entities on the same network. In some examples, requesting entity 102 is one entity of a plurality of entities operating in a same VLAN that interfaces with, or is hosted by, the hypervisor, where the hypervisor interfaces with any suitable number of different VLANs. Furthermore, although only one hypervisor is shown in FIG. 1A, it will be understood that a computer network as described herein includes any suitable number of hypervisors, each hosting any suitable number of virtual network entities.

Similarly, the SDN controller takes any suitable form. As one non-limiting example, the SDN controller is a software application that coordinates data flow and traffic management for a software-defined network, including facilitating northbound and southbound traffic between physical and virtual network components. In some examples, the SDN controller is at least partially implemented by a physical hardware device (e.g., field-programmable gate array) installed in, or otherwise communicatively coupled with, the hypervisor hardware. In some examples, the SDN controller is implemented as or by computing system 500 described below with respect to FIG. 5.

Figure 1B:
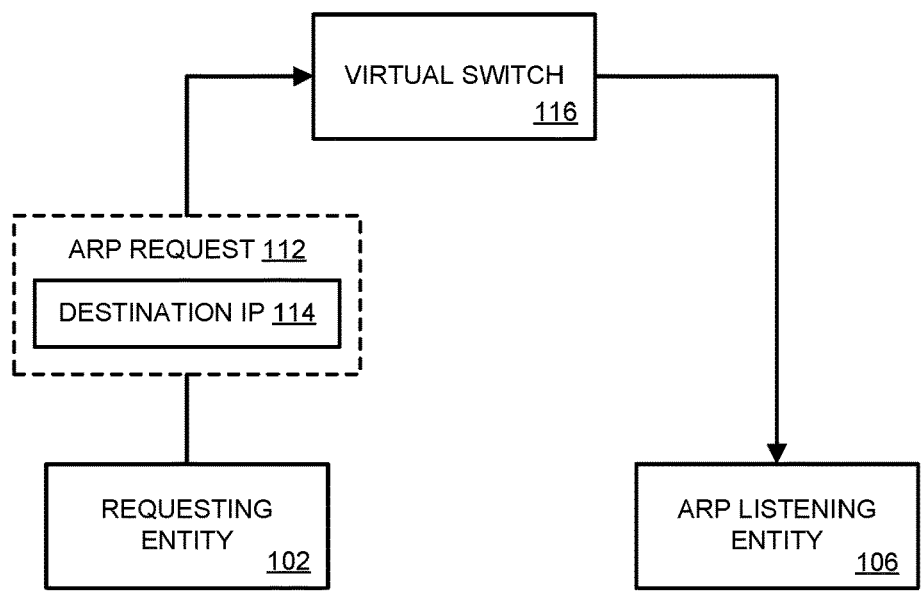

Turning now to FIG. 1B, requesting entity 102 transmits an ARP request 112 for a MAC address of the destination entity. The ARP request specifies an IP address 114 corresponding to the destination entity. In this example, the ARP request is forwarded to the ARP listening entity 106 by a virtual switch 116 implemented by the hypervisor. In some cases, even when the computer network as a whole does not support broadcasting of the ARP request, broadcasting is still supported by the virtual switch. In other words, in the example of FIG. 1B, the ARP request is broadcast by the requesting entity over the virtual switch implemented by the hypervisor. In other examples, the ARP request is transmitted in another suitable way—e.g., by a suitable physical network switch.

Figure 1C:
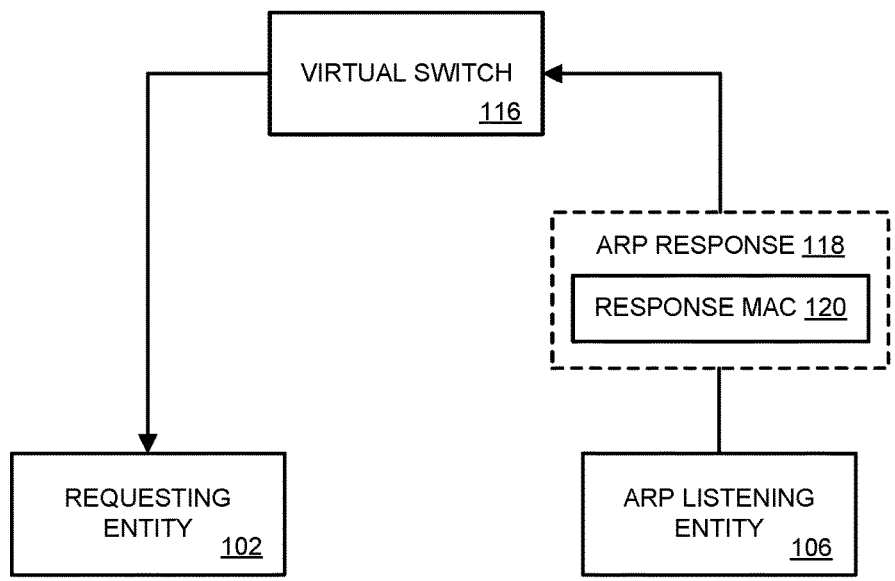

Turning now to FIG. 1C, the ARP listening entity transmits an ARP response 118 to the requesting entity. The ARP response specifies a response MAC address 120. As will be described in more detail below, in some cases the response MAC address is a predefined, placeholder MAC address usable by local network entities to refer to any or all non-local network entities (e.g., physical and/or virtual entities in a different IP subnet and/or beyond a network gateway). The placeholder MAC address takes any suitable form—e.g., a generic MAC address that does not correspond to any particular device, but is useable to refer to any network entities outside the local network node. In some examples, the ARP listening entity implements a suitable service, such as Linux® ebtables, to automatically respond to the ARP request with the predefined placeholder MAC address and the original IP address of the destination entity specified by the ARP request. In some cases, this occurs after the ARP listening entity determines that it is responsible for responding to ARP requests targeting that IP address—e.g., the ARP listening entity maintains a table of IP addresses corresponding to network entities outside the local hypervisor environment for which the ARP listening entity should provide ARP responses. This beneficially enables the requesting entity to transmit normal ARP requests, and enables resolution of such requests in non-broadcast network contexts, without requiring special configuration of the requesting entity.

In other cases, as will be described in more detail below, the response MAC address is the actual MAC address of the destination entity. For example, prior to transmitting the ARP response to the requesting entity, the ARP listening entity retrieves the actual MAC address of the destination entity from an existing IP-to-MAC mapping—e.g., maintained by the SDN controller. This beneficially enables the requesting entity to transmit data packets directly targeting the actual MAC address of the destination entity, without use of an intermediary placeholder MAC address.

Figure 1D:
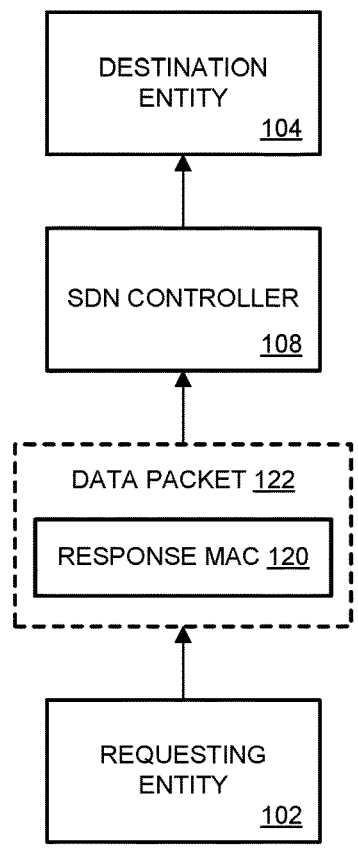

Turning now to FIG. 1D, requesting entity 102 transmits a data packet 122 intended for delivery to the destination entity. It will be understood that the data packet takes any suitable form and includes any suitable data. It will be understood that the present disclosure is directed to techniques for facilitating data communication between the requesting entity and destination entity, and is agnostic as to the specific data exchanged once such communication is established. Furthermore, though referred to herein as a data "packet," it will be understood that in some cases the data transmitted by the requesting entity additionally or alternatively includes a data frame.

The data packet targets the response MAC 120 specified by the ARP response provided by the ARP listening entity after receiving the ARP request. Though not shown in FIG. 1D, it will be understood that, in some cases, the data packet also specifies the IP address of the destination entity included in the ARP request.

Once transmitted by the requesting entity, the data packet is in some cases processed or modified by the SDN controller en route to the destination entity. This can include performing suitable data encapsulation—e.g., virtual exchange LAN (VXLAN) encapsulation. Furthermore, as discussed above, the SDN controller in some cases replaces the destination MAC in the data packet with an actual MAC address of the destination entity—e.g., in scenarios where the response MAC address provided by the ARP listening entity is a predefined, placeholder MAC. Regardless, the data packet is eventually received at the destination entity. In some examples, the destination entity is a virtual machine hosted by a different hypervisor. Thus, in some cases, the data packet is de-encapsulated and passed by the destination hypervisor to the destination virtual machine over a corresponding tagged VLAN of the destination hypervisor.

Figure 2A:
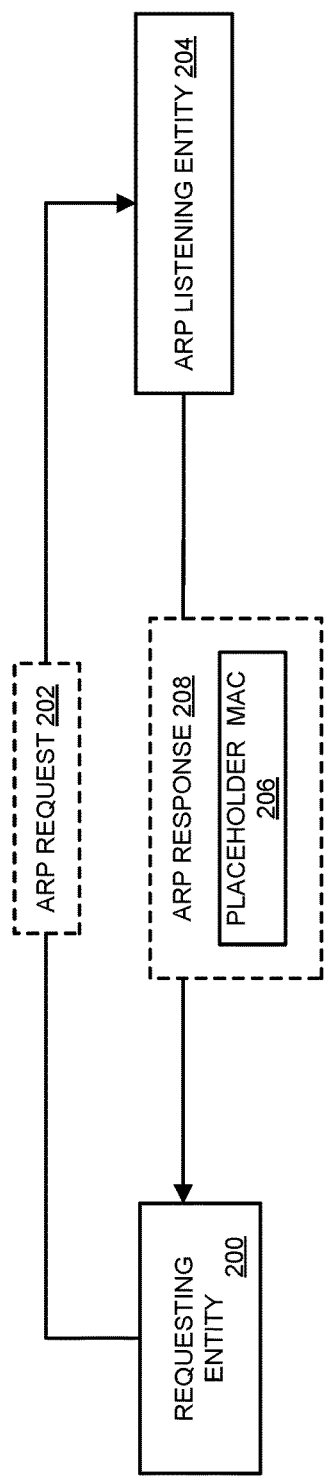
FIGS. 2A and 2B schematically illustrate responding to an address resolution protocol (ARP) request with a placeholder media access control (MAC) address.
Figure 2B:
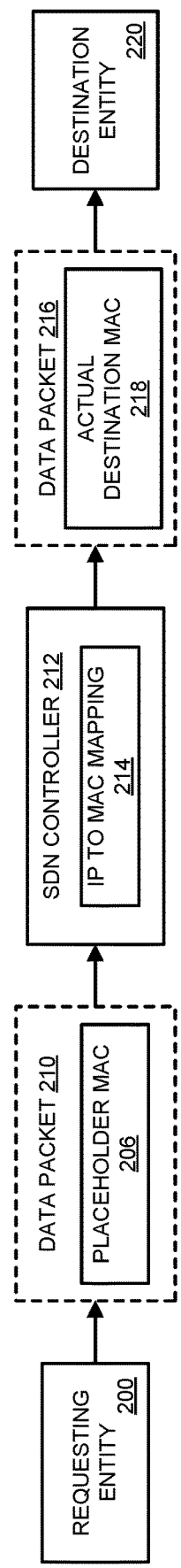

FIGS. 2A and 2B schematically illustrate a scenario where the ARP response includes a predefined, placeholder MAC address. Specifically, FIG. 2A shows another example requesting entity 200, which transmits an ARP request 202 to an ARP listening entity 204. As discussed above, in some examples, the requesting entity and ARP listening entity are each virtual machines hosted by a same hypervisor. In other examples, as discussed above, network "entities" as described herein take other suitable forms—e.g., any suitable physical or virtualized network components.

As shown in FIG. 2A, the ARP listening entity provides an ARP response 208 to the ARP request. In this example, the response MAC included in the ARP response is a predefined, placeholder MAC address 206. As discussed above, this is a MAC address that does not necessarily correspond to any particular entity, but rather is useable by local network entities in the same network node (e.g., virtual machines and interfaces hosted by the same hypervisor) to refer to non-local network entities (e.g., entities on another IP subnet or beyond a network gateway). In some cases, the same predefined placeholder MAC address is used by any or all hypervisors in the computer network, as any data packets targeting the placeholder MAC are modified by the SDN controller as they exit their local node.

FIG. 2B schematically illustrates the requesting entity 200 transmitting a data packet 210 that targets the placeholder MAC address. The data packet is delivered to the destination entity with the actual MAC address of the destination entity in lieu of the predefined placeholder MAC address. In some cases, prior to receipt at a destination entity, the data packet is modified by the SDN controller 212, which maintains an IP-to-MAC mapping 214 that associates IP addresses of one or more network entities in the computer network with the actual MAC addresses of the one or more network entities. In cases where the SDN controller is at least partially implemented by a physical controller device (e.g., field-programmable gate array) communicatively coupled with the hypervisor, then at least a portion of the IP-to-MAC mapping may be locally stored on the physical controller device. Additionally, or alternatively, at least a portion of the IP-to-MAC mapping is accessed from a global control plane of the computer network—e.g., the mapping is maintained by a centralized software-based SDN controller. Furthermore, in some cases the IP-to-MAC mapping is additionally or alternatively maintained by one or more network entities besides the SDN controller—e.g., the ARP listening entity, or a network router. In some examples, the IP-to-MAC mapping takes the form of an IP address routing table used when routing the request from the requesting entity.

Regardless, in the example of FIG. 2B, the data packet is modified by the SDN controller to give a modified data packet 216, in which the placeholder MAC address 206 is replaced by an actual MAC address 218 of the destination entity, according to the IP-to-MAC mapping. As discussed above, in some cases the SDN controller additionally performs suitable data encapsulation, such as VXLAN encapsulation. The modified data packet 216 is eventually received at a destination entity 220.

Figure 3A:
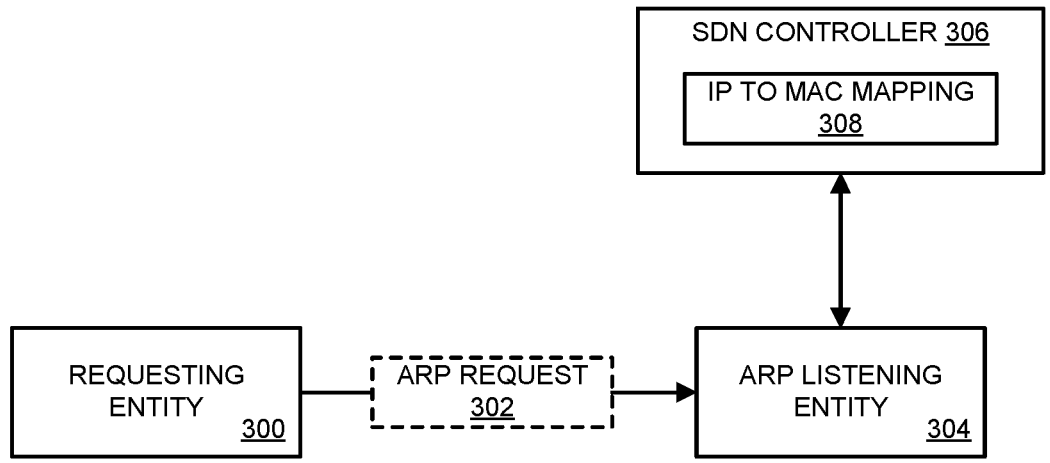
FIGS. 3A and 3B schematically illustrate responding to an ARP request with an actual MAC address for the destination entity.

In some examples, rather than the ARP listening entity responding with a predefined placeholder MAC address, the ARP listening entity responds to the ARP request with the actual MAC address of the destination entity. This scenario is schematically illustrated with respect to FIGS. 3A and 3B. FIG. 3A schematically shows another example requesting entity 300, transmitting an ARP request 302 to an ARP listening entity 304. However, in this example, the ARP listening entity consults an SDN controller 306 to retrieve the actual MAC address of the destination entity having the IP address specified by the ARP request, according to an IP-to-MAC mapping 308 maintained by, or otherwise accessible to, the SDN controller. In other examples, as discussed above, the IP-to-MAC mapping is maintained by one or more network entities in addition to, or instead of, the SDN controller, and the ARP listening entity may consult any or all of such entities to determine the actual MAC address of the destination entity.

Figure 3B:
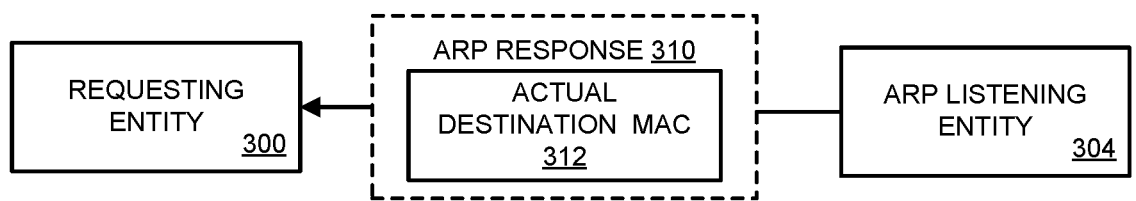

In FIG. 3B, the ARP listening entity transmits an ARP response 310 to the ARP request. In this example, the ARP response specifies the actual MAC address 312 of the destination entity. Thus, upon receiving the ARP response, the requesting entity is able to transmit a data packet directly targeting the actual MAC address of the destination entity, instead of targeting a placeholder MAC address that is later modified by the SDN controller.

Figure 4:
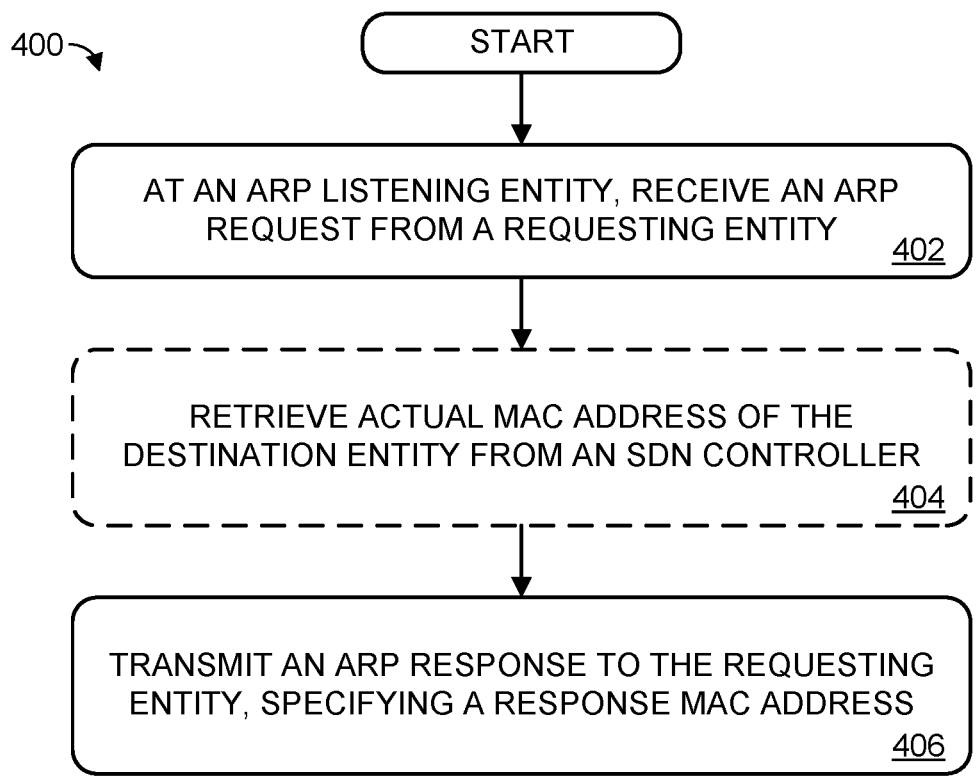
FIG. 4 illustrates an example method for resolving ARP requests.

FIG. 4 illustrates an example method 400 for ARP request resolution in a computer network. Steps of method 400 are performed by any suitable physical and/or virtual network entities—e.g., physical computing devices, virtual machines, network management services, or software applications—each having any suitable capabilities and configurations. Steps of method 400 may be repeated, looped, or triggered at any suitable time and in response to any suitable condition. In some cases, any or all steps of method 400 are performed by computing system 500 described below with respect to FIG. 5.

At 402, method 400 includes, at an ARP listening entity of a computer network, receiving an ARP request for a MAC address of a destination entity having a specified IP address, the ARP request received from a requesting entity. This is done substantially as described above with respect to FIG. 1B, schematically showing a requesting entity 102 transmitting an ARP request to an ARP listening entity 106, the ARP request specifying an IP address of a destination entity.

At 404, method 400 optionally includes, at the ARP listening entity, retrieving the actual MAC address of the destination entity—e.g., from an SDN controller, and/or from another suitable network entity. Specifically, as discussed above, the SDN controller in some cases maintains or otherwise has access to an IP-to-MAC mapping that associates IP addresses of at least some entities in the computer network with the actual MAC addresses corresponding to such entities. Thus, based on the IP address of the destination entity (as specified in the original ARP request), the SDN controller is able to provide the actual MAC address of the destination entity to the ARP listening entity for inclusion in an ARP response.

At 406, method 400 includes, at the ARP listening entity, transmitting an ARP response to the requesting entity, the ARP response specifying a response MAC address. The ARP response facilitates transmission, by the requesting entity, of a data packet targeting the response MAC address. Furthermore, prior to receipt of the data packet at the destination entity, the specified IP address is associated with an actual MAC address of the destination entity according to an IP-to-MAC mapping. As discussed above, in some cases the response MAC address is the actual MAC address of the destination entity (e.g., as previously retrieved from the SDN controller in step 404). In other cases, the response MAC address is a predefined placeholder MAC address useable by any local network entities to refer to non-local network entities. In such cases, the data packet is delivered to the destination entity with the actual MAC address of the destination entity in lieu of the placeholder MAC address—e.g., because the data packet is modified en route by the SDN controller.

In any case, the techniques described herein beneficially enable resolution of the ARP request and communication between the requesting and destination entities, even in network settings where typical ARP broadcast is not possible. This provides a technical benefit of improving performance of the computer network, enabling ARP resolution in cases where such resolution otherwise would not be possible. Additionally, the techniques described herein provide the technical benefit of reducing the burden of user input to a computing system by enabling ARP resolution without requiring special manual configuration of the requesting or destination entities.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
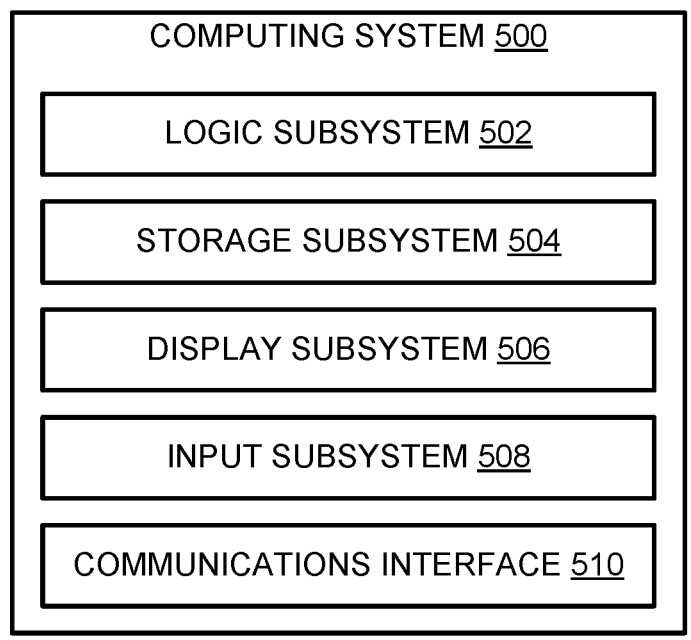
FIG. 5 schematically shows an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IOT) devices, embedded computing devices, and/or other computing devices.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 506 may be used to present a visual representation of data held by storage subsystem 504. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. Communication subsystem 510 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for resolving ARP (address resolution protocol) requests comprises: at an ARP listening entity of a computer network, receiving an ARP request for a MAC (media access control) address of a destination entity having a specified IP (internet protocol) address, the ARP request received from a requesting entity, wherein a design of the computer network prevents broadcast of the ARP request to the destination entity; and transmitting an ARP response to the requesting entity, the ARP response specifying a response MAC address to facilitate transmission, by the requesting entity, of a data packet targeting the response MAC address, and wherein prior to receipt of the data packet at the destination entity, the specified IP address is associated with an actual MAC address of the destination entity according to an IP-to-MAC mapping. In this example or any other example, the response MAC address is a predefined placeholder MAC address. In this example or any other example, the method further comprises causing the data packet to be delivered to the destination entity with the actual MAC address of the destination entity in lieu of the predefined placeholder MAC address. In this example or any other example, the response MAC address provided by the ARP listening entity is the actual MAC address of the destination entity. In this example or any other example, wherein prior to transmitting the ARP response to the requesting entity, the ARP listening entity retrieves the actual MAC address of the destination entity from an SDN (software-defined networking) controller of the computer network. In this example or any other example, a security configuration of the computer network prevents broadcast of the ARP request to the destination entity. In this example or any other example, the requesting entity and the ARP listening entity are each VMs (virtual machines) hosted by a same hypervisor. In this example or any other example, the ARP request is broadcast by the requesting entity over a virtual switch implemented by the hypervisor.

In an example, a computer network includes an ARP (address resolution policy) listening entity configured to: receive an ARP request for a MAC (media access control) address of a destination entity of the computer network having a specified IP (internet protocol) address, the ARP request received from a requesting entity, wherein a design of the computer network prevents broadcast of the ARP request to the destination entity; and transmit an ARP response to the requesting entity, the ARP response specifying a response MAC address to facilitate transmission, by the requesting entity, of a data packet targeting the response MAC address, and wherein prior to receipt of the data packet at the destination entity, the specified IP address is associated with an actual MAC address of the destination entity according to an IP-to-MAC mapping. In this example or any other example, the response MAC address is a predefined placeholder MAC address. In this example or any other example, the data packet is delivered to the destination entity with the actual MAC address of the destination entity in lieu of the predefined placeholder MAC address. In this example or any other example, the response MAC address provided by the ARP listening entity is the actual MAC address of the destination entity. In this example or any other example, prior to transmitting the ARP response to the requesting entity, the ARP listening entity retrieves the actual MAC address of the destination entity from an SDN (software-defined networking) controller. In this example or any other example, a security configuration of the computer network prevents broadcast of the ARP request to the destination entity. In this example or any other example, the requesting entity and the ARP listening entity are each VMs (virtual machines) hosted by a same hypervisor. In this example or any other example, the ARP request is broadcast by the requesting entity over a virtual switch implemented by the hypervisor.

In an example, a method for resolving ARP (address resolution protocol) requests comprises: at an ARP listening entity of a computer network, receiving an ARP request for a MAC (media access control) address of a destination entity having a specified IP (internet protocol) address, the ARP request received from a requesting entity, wherein a design of the computer network prevents broadcast of the ARP request to the destination entity; and transmitting an ARP response to the requesting entity, the ARP response specifying a predefined placeholder MAC address to facilitate transmission, by the requesting entity, of a data packet targeting the predefined placeholder MAC address, and wherein prior to receipt of the data packet at the destination entity, the predefined placeholder MAC address is replaced with an actual MAC address of the destination entity according to an IP-to-MAC mapping. In this example or any other example, a security configuration of the computer network prevents broadcast of the ARP request to the destination entity. In this example or any other example, the requesting entity and the ARP listening entity are each VMs (virtual machines) hosted by a same hypervisor. In this example or any other example, the ARP request is broadcast by the requesting entity over a virtual switch implemented by the hypervisor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for resolving ARP (address resolution protocol) requests, the method comprising:
    at an ARP listening entity of a computer network, receiving an ARP request for a MAC (media access control) address of a destination entity having a specified IP (internet protocol) address, the ARP request received from a requesting entity, wherein a design of the computer network prevents broadcast of the ARP request to the destination entity;
    transmitting an ARP response to the requesting entity, the ARP response specifying a response MAC address to facilitate transmission, by the requesting entity, of a data packet targeting the response MAC address,
    wherein the response MAC address is a predefined placeholder MAC address, and wherein prior to receipt of the data packet at the destination entity, the specified IP address is associated with an actual MAC address of the destination entity according to an IP-to-MAC mapping; and
    causing the data packet to be delivered to the destination entity with the actual MAC address of the destination entity in lieu of the predefined placeholder MAC address.

2. The method of claim 1, wherein the actual MAC address of the destination entity is retrieved from an SDN (software-defined networking) controller of the computer network.

3. The method of claim 1, wherein a security configuration of the computer network prevents broadcast of the ARP request to the destination entity.

4. The method of claim 1, wherein the requesting entity and the ARP listening entity are each VMs (virtual machines) hosted by a same hypervisor.

5. The method of claim 4, wherein the ARP request is broadcast by the requesting entity over a virtual switch implemented by the hypervisor.

6. A computer network
    including an ARP (address resolution policy) listening entity a logic subsystem comprising one or more physical devices configured to:
    receive an ARP request for a MAC (media access control) address of a destination entity of the computer network having a specified IP (internet protocol) address, the ARP request received from a requesting entity, wherein a design of the computer network prevents broadcast of the ARP request to the destination entity;

transmit an ARP response to the requesting entity, the ARP response specifying a response MAC address to facilitate transmission, by the requesting entity, of a data packet targeting the response MAC address, wherein the response MAC address is a predefined placeholder MAC address, and wherein prior to receipt of the data packet at the destination entity, the specified IP address is associated with an actual MAC address of the destination entity according to an IP-to-MAC mapping; and cause the data packet to be delivered to the destination entity with the actual MAC address of the destination entity in lieu of the predefined placeholder MAC address.

7. The computer network of claim 6, wherein the actual MAC address of the destination entity is retrieved from an SDN (software-defined networking) controller.

8. The computer network of claim 6, wherein a security configuration of the computer network prevents broadcast of the ARP request to the destination entity.

9. The computer network of claim 6, wherein the requesting entity is a virtual machine (VM) hosted by a hypervisor.

10. The computer network of claim 9, wherein the ARP request is broadcast by the requesting entity over a virtual switch implemented by the hypervisor.

* * * * *